Dec. 18, 1934.  A. E. FORNWALT  1,984,828
TRAIN PIPE VALVE
Filed Nov. 21, 1932   2 Sheets-Sheet 1
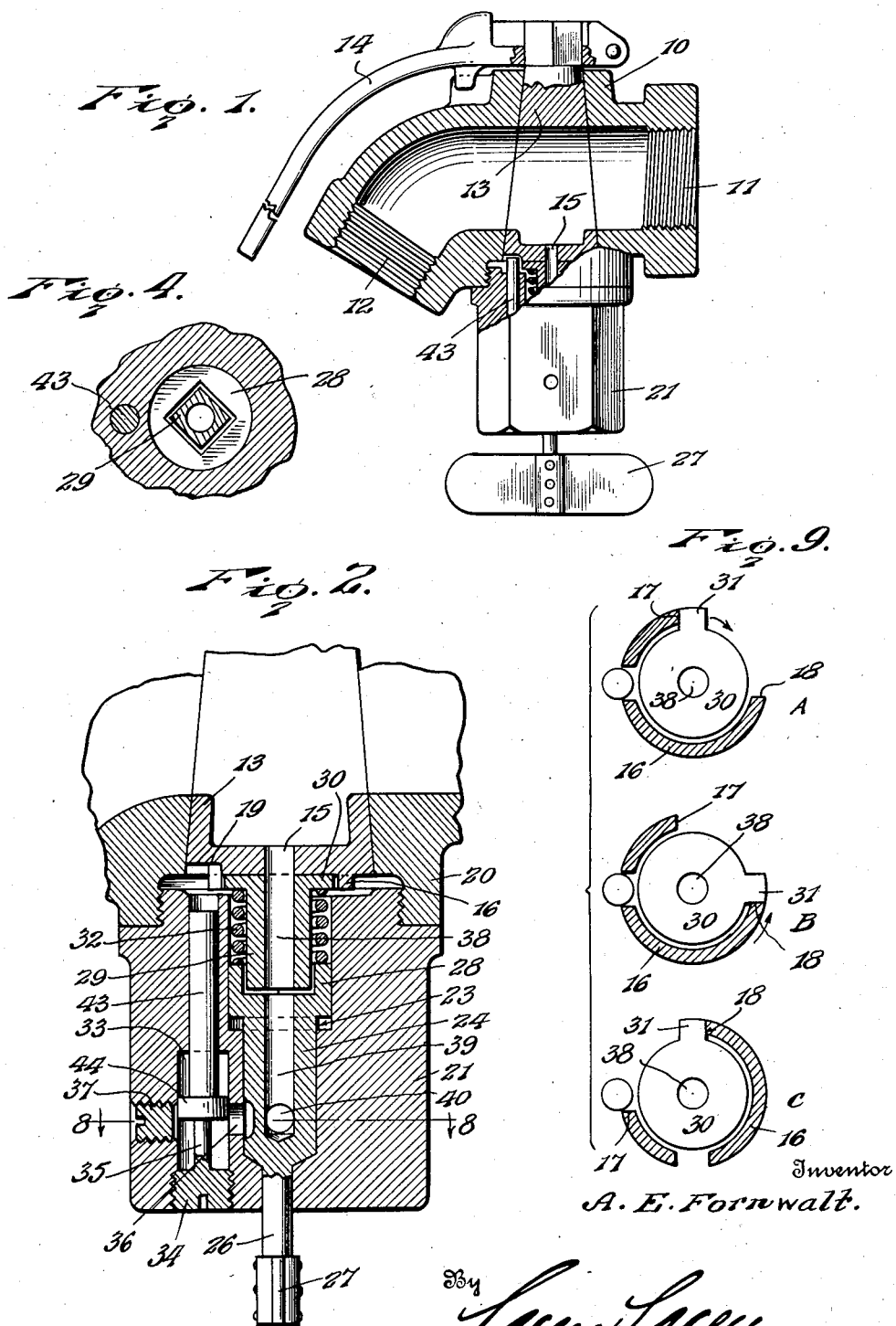

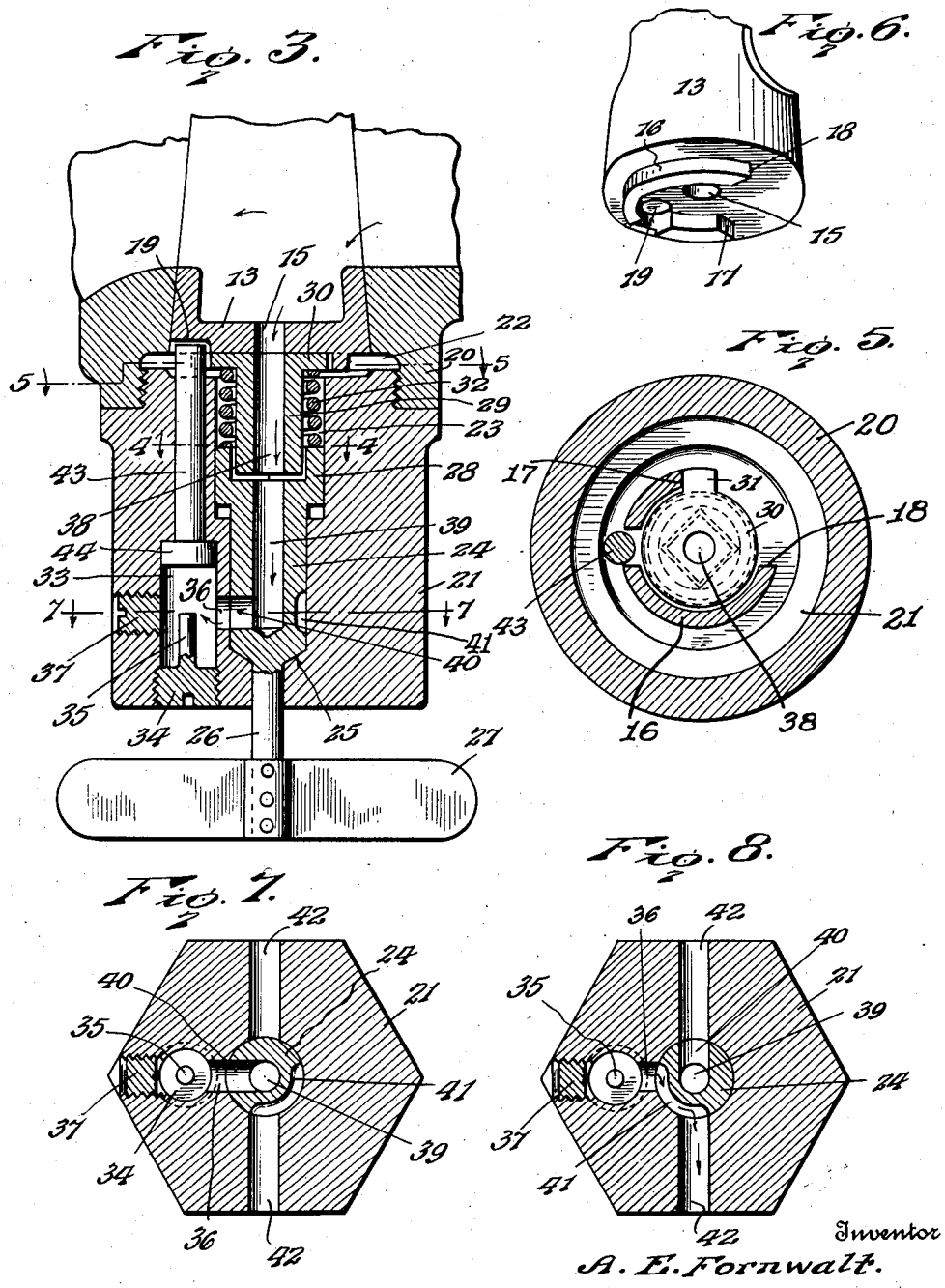

Patented Dec. 18, 1934

1,984,828

UNITED STATES PATENT OFFICE 1,984,828

TRAIN PIPE VALVE

Alexander E. Fornwalt, Johnstown, Pa.

Application November 21, 1932, Serial No. 643,758

7 Claims. (Cl. 251—164)

This invention relates to an improved car line brake pipe valve and seeks, among other objects, to provide a valve wherein, when the valve is opened, the valve plug will be automatically locked in open position.

A further object of the invention is to provide a valve wherein the valve plug cannot, after having been rotated to open position, be again rotated to closed position without bleeding the train line and thus operating the triple valve of the air brake system for applying the brakes and giving the trainmen a signal that the air brake line has been molested.

A further object of the invention in this connection is to provide a manually operable auxiliary valve for controlling the pressure actuated plunger employed to lock the valve plug and wherein the manual operation of the auxiliary valve to cause retraction of said plunger and freeing of the plug will serve to bleed the train line.

The invention seeks, as a further object, to provide a valve wherein, when the plug is rotated to closed position, the auxiliary valve will be automatically turned by the plug and thus reset to cause the automatic actuation of the plunger for locking the valve plug when next opened.

And a still further object of the invention is to provide an improved clutch connection between the valve plug and the auxiliary valve whereby the auxiliary valve may be manually turned independently of the plug.

Other and incidental objects, not specifically mentioned in the foregoing, will be apparent during the course of the following description.

In the accompanying drawings forming part of this specification,

Figure 1 is a view partly in section and partly in elevation of my improved valve, Figure 2 is an enlarged fragmentary sectional view particularly showing the auxiliary valve, the locking plunger being retracted, Figure 3 is a view similar to Figure 2 showing the locking plunger projected, Figure 4 is a detail section on the line 4—4 of Figure 3, Figure 5 is a transverse section on the line 5—5 of Figure 3, Figure 6 is a fragmentary perspective view showing the lower end of the valve plug, Figure 7 is a section on the line 7—7 of Figure 3 showing the normal set position of the auxiliary valve, Figure 8 is a view similar to Figure 7 showing the auxiliary valve turned to bleed the train line and effect retraction of the locking plunger, and Figure 9 is a diagrammatic view showing the three positions of the auxiliary valve.

In carrying the invention into effect, I employ a valve casing 10 provided with the usual inlet 11 and outlet 12. Journaled through the casing is a tapered valve plug 13 to the upper end of which is fixed a lever 14 for turning the plug to open and closed positions. As seen in Figure 6, the plug is provided with a flat bottom face and formed through the bottom wall of the plug, axially thereof, is a passage 15 communicating with the main fluid passage of the plug. Formed on the flat bottom face of the plug is an arcuate flange 16 the ends of which provide shoulders 17 and 18, respectively, and at a point adjacent the shoulder 17 said flange is interrupted to expose a socket 19 in the bottom wall of the plug.

Formed on the valve casing 10, at its lower side, is a flange 20 and screwed into said flange is a cap 21 defining a chamber 22 between the valve casing and the cap, the chamber being of a depth to freely accommodate the flange 16 on the valve plug 13. The cap is provided axially with a chamber 23 reduced at its lower end portion, and rotatably fitting in said chamber is a control valve 24. At the bottom of the chamber 23 is a conical valve seat 25 while the lower end of the valve 24 is beveled to fit closely against said seat, and extending from the valve through the lower end of the cap 21 is a stem 26 to which is fixed a handle 27. In the present instance, the valve 24 is shown as being straight but said valve may be tapered if so desired, and formed on the upper end of the valve is an enlarged socket 28 rotatable in the larger upper end of the chamber 23. As shown in detail in Figure 4, the socket 28 is squared and slidably fitting in said socket is the lower end of a squared tubular clutch member 29 provided at its upper end with an annular flange 30 from which projects a radial lug 31. As seen in Figure 5, the flange 30 is more or less closely received within the flange 16 of the plug 13 to seat flat against the bottom face of said plug so that the lug 31 projects between the ends of the flange 16, and interposed between the flange 30 and the upper end of the socket 28 is a spring 32. As will thus be perceived, this spring not only presses the valve 24 downwardly into tight contact with the seat 25 but also presses the clutch member 29 upwardly to maintain the flange 30 in frictional contact with the flat bottom face of the valve plug 13.

Formed through the cap 21 from the lower end thereof is a cylindrical chamber 33 closed by a plug 34 from which rises a stop pin 35, and formed in the side wall of said chamber, next to the chamber 23, is a port 36. In alinement with the port 36, the cap 21 is necessarily provided with a suitable opening in order that said port might be bored and closing said opening is a plug 37.

As previously noted, the clutch member 29 is of tubular construction, being provided with a central passage 38 and it is now to be observed that the valve 24 is also of tubular construction, being formed with a central passage 39. At the level of the port 36, the valve is formed with a port 40 adapted to register with the port 36 and is also provided externally with a passage 41. Intersecting the chamber 23, at the level of the passage 41, is a passage 42 open to the atmosphere and, as shown in Figure 8, the passage 41 is adapted to connect the port 36 with the passage 42. Slidable in the cap 21 is a locking plunger 43, the upper end of which is receivable in the socket 19 of the valve plug 13 while, at its lower end, said plunger is provided with a head or piston 44 slidable in the chamber 33. As shown in Figure 2, the pin 35 on the plug 34 is adapted to limit the downward movement of the plunger so that the head 44 does not entirely cover the port 36. Assuming now that the valve plug 13 is open, the parts will normally occupy the positions shown in Figures 1 and 3 of the drawings, the port 40 of the valve 24 being in register with the port 36 of the chamber 33 and the passage 42 of the cap 21 being closed by the valve, as seen in Figure 7. Thus, air under pressure in the train line will flow down through the passage 15 of the plug 13 and passage 38 of the clutch member 29 and through the passage 39 of the valve 24 to enter the chamber 33 through the ports 36 and 40 so that the plunger 43 will be forced upwardly to engage in the socket 19 of the valve plug 13 for thus normally locking said valve plug in open position, the valve 24 serving, as shown in Figure 7, to normally close the passage 42. In the locked position of the valve plug 13, the lug 31 of the clutch member 29 is, as shown in the first diagrammatic view of Figure 9, normally in engagement with the shoulder 17 of the flange 16 on the lower end of the valve plug.

Further assuming now that it is desired to rotate the plug 13 and close the main valve, the handle 27 of the control valve 24 is grasped and said control valve manually turned in a clockwise direction, as viewed in Fig. 9. Turning of the control valve will, of course, cause a corresponding movement of the clutch member 29 so that the control valve is rotated until the lug 31 of said clutch member strikes the shoulder 18 of flange 16 on the lower end of the plug 13, as shown in the second diagrammatic view of Figure 9. The clutch member 29 will, of course, permit the manual rotation of the valve 24 independently of the valve plug 13, the flange 30 of said clutch member turning against the flat bottom face of the valve plug as the valve 24 is rotated and when the lug 31 of the clutch member strikes the shoulder 18 of the flange 16 of the plug 13, as just described, the port 40 of the valve 24 will, as shown in Figure 8, be in register with one end of the passage 42 while the passage 41 will connect the port 36 of the chamber 33 with the other end of the passage 42. Thus, air from the train line will flow through the axially alined passages 15, 38 and 39, the port 40 and the adjacent end of the passage 42 and will bleed the train line so that the triple valve of the air brake system will be operated for applying the brakes and giving the trainmen a signal that the air brake line has been molested. At the same time, the chamber 33 will be exhausted to the atmosphere through the port 36, passage 41 and the adjacent end of the passage 42, relieving the pressure under the locking plunger and permitting the plunger to drop, and it may be noted that any air under pressure flowing through the passage 38 of the clutch member 29 which may escape at the lower end of said clutch member into the chamber 22 will function to force the plunger 43 downwardly and thus automatically unlock the valve plug 13. Accordingly, the lever 14 may then be operated for rotating said plug and closing the main valve. As the valve 13 is closed, any trapped air will escape through the passages 39, 40 and 42.

Figure 2 of the drawings shows the valve 24 rotated a quarter turn, as just previously described, to effect retraction of the plunger 43, the plunger being shown retracted, and it will now be assumed that the valve plug 13 is rotated to close the main valve. Rotation of the plug 13 to closed position by the handle 14 will cause the shoulder 18 of the flange 16 of said plug to engage the lug 31 of the clutch member 29 and rotate said clutch member with the plug. The valve 24 will, of course, be correspondingly rotated by the clutch member so that by the time the plug 13 reaches a closed position, the shoulder 18 of said plug will have returned the clutch member and valve 24, as shown in the third diagrammatic view of Figure 9, to the same position shown in the first diagrammatic view of Figure 9. Closing of the valve plug 13 will thus serve to automatically reset the valve 24 to the position shown in Figures 3 and 7 so that when the plug 13 is next turned to open the main valve and air under pressure in the train line is admitted to the passage 15 of the plug, communication between said passage and the chamber 23 will be established by the valve 24 with the result that the plunger 43 will be again projected for locking the plug 13 in open position.

I accordingly provide a device wherein the main valve plug will be locked each time the main valve is opened and wherein said plug can again be turned to closed position only after the manipulation of the manually controlled valve which manipulation of said manually controlled valve will serve to bleed the train line and signal the trainmen. Furthermore, as will be seen, rotation of the valve plug to close the main valve will serve to automatically reset the manually controlled valve to effect the automatic locking of the main valve plug when it is next turned to open position. It is to be noted that the valve 24 is held against its seat not only by the spring 32 but also by the pressure of air in the valve. Leakage of air around the valve stem 26 will thus be obviated without rendering the valve too difficult of manual operation. However, the frictional drag between the valve plug 13 and the clutch member 29 is not alone sufficient to turn the valve. Accordingly, when the valve 24 is in the position shown in Figure 2 and the valve plug 13 is rotated independently of said valve, as previously described, to open the main valve, rotation of the plug will not serve to turn the valve 24 therewith.

Having thus described the invention, I claim:

1. A valve for train pipes including a casing, a plug rotatable therein, means operable by fluid pressure in the pipe for locking the plug in open position, a control valve individually movable manually to one position for bleeding the pipe and exhausting fluid pressure behind said means for releasing the plug, and means operatively connecting the control valve with the plug whereby when the plug is turned to closed position the control valve will be turned by the plug to a position for admitting fluid pressure behind said means when the plug is next turned to open position.

2. A valve for train pipes including a casing, a plug rotatable therein, a plunger in the casing for locking the plug in open position, and a control valve mounted in the casing and having a lost motion connection with the plug movable to one position admitting pressure behind the plunger to project said plunger to engage the plug and movable to another position exhausting fluid pressure behind the plunger and bleeding the train pipe whereby to effect retraction of the plunger.

3. A valve for train pipes including a casing, a plug rotatable therein, a plunger for locking the plug in open position, a control valve movable to one position for admitting pressure in the pipe behind the plunger to project said plunger to engage the plug, and a clutch connecting the control valve with the plug for moving the control valve to said position as the plug is turned to closed position, the control valve being manually movable independently of the plug to a position exhausting fluid pressure behind said plunger for releasing the plug.

4. A valve for train pipes including a casing, a plug rotatable therein, a plunger operable by fluid pressure in the pipe for locking the plug in open position, a control valve movable to one position admitting pressure in the pipe behind the plunger to project the plunger to engage the plug, a clutch member forming a connection between the plug and control valve, a spring interposed between the control valve and clutch member and urging said member to engage the plug, and means on the plug to coact with said clutch member for rotating said member and turning the valve to said position as the plug is rotated to closed position, the control valve being independently movable manually to another position for bleeding the pipe and exhausting fluid pressure behind said plunger for releasing the plug.

5. A valve for train pipes including a casing, a plug rotatable therein, a plunger operable by fluid pressure in the pipe for locking the plug in open position, a control valve individually movable manually to one position for bleeding the pipe and exhausting fluid pressure behind said plunger for releasing the plug, a seat for said control valve, a clutch member frictionally contacting the plug and operatively engaging the control valve for rotating said valve, a spring interposed between the control valve and said clutch member for urging the control valve into engagement with said seat and urging the clutch member into engagement with the plug, a lug on said clutch member, and a shoulder on the plug to engage said lug for turning the clutch member and as the plug is rotated to closed position turning the control valve to a position for admitting fluid pressure behind said plunger when the plug is next turned to open position.

6. A valve for train pipes including a casing, a plug rotatable therein, a cap carried by the casing, a plunger carried by the cap and operable by fluid pressure in the pipe for locking the plug in open position, a control valve, and means forming a connection between the plug and control valve admitting of limited independent movement of the valve relative to the plug, the valve being independently movable manually to one position for bleeding the pipe and exhausting fluid pressure behind said plunger for releasing the plug and being movable by the plug to another position for admitting fluid pressure behind the plunger.

7. A valve for train pipes comprising a casing, a rotatable plug therein, said plug having a central port in its basal end and provided on said end with a divided flange concentric with said port and having spaced ends, a cap secured to the casing and having an axial chamber alined with said port in the plug and also having a transverse passage communicating with said chamber near the lower end thereof, there being a second chamber in the cap parallel with the axial chamber and a port establishing communication between the two chambers, a plunger in the second chamber arranged to engage the plug and lock it in open position, a valve mounted in the axial chamber and having an axial passage alined with the port in the plug and also having a lateral port communicating with said passage, and an external passage in the same plane with said port, said port and said external passage being alternately engageable with the port between the two chambers and the transverse passage in the cap, and a clutch member between said valve and plug and engaged with the valve to turn therewith, said clutch member having an axial passage alined with the port in the plug and the axial passage in the valve and being further provided at its upper end with a radial lug disposed between and engageable with the ends of the flange on the plug.

ALEXANDER E. FORNWALT. [L. S.]